3,355,527
PROCESS FOR MANUFACTURING
CARBON PRODUCTS
Akinori Muta, Suginami-ku, Tokyo-to, Masaaki Furukawa, Hino-shi, Tokyo-to, and Kinichi Koyama, Nishitama-gun, Tokyo-to, Japan, assignors to Kabushiki Kaisha Hitachi Seisakusho and Hitachi Kasei Kogyo Kabushiki Kaisha, both of Chiyoda-ku, Tokyo-to, Japan, both joint-stock companies
Filed July 6, 1965, Ser. No. 469,571
Claims priority, application Japan, July 7, 1964, 39/37,956
2 Claims. (Cl. 264—29)

ABSTRACT OF THE DISCLOSURE

A process for the manufacture of carbon products of high heat resistance and impermeability. A resin is synthesized from pyrrole and furfural, formed into a desired shape and sintered and carbonized directly in a non-oxidizing atmosphere. The characteristics of the resulting product combine the advantages of glass and graphite without their disadvantages, and the resins find application in the high-temperature chemical industry, the metal industry and in atomic power plants.

---

Figure 1:
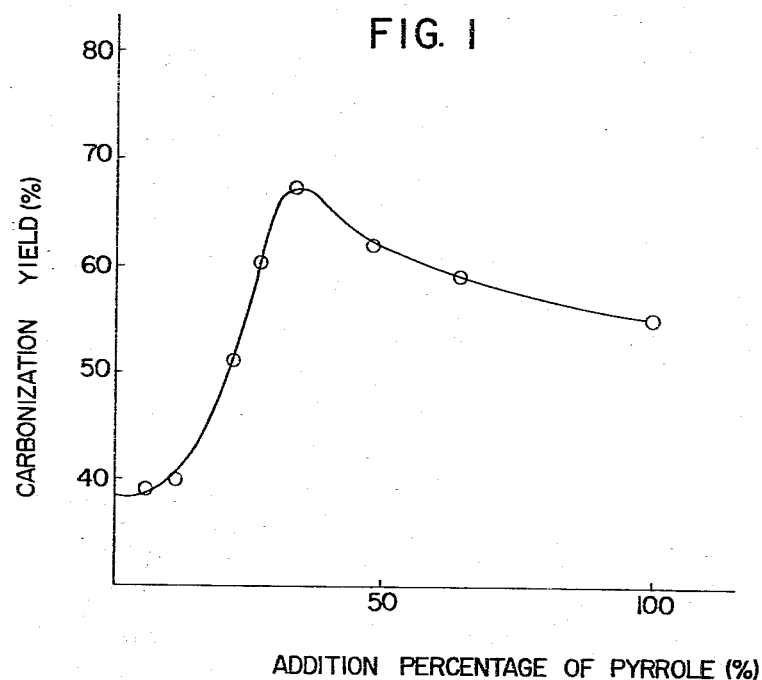

This invention relates to a new process for manufacturing carbon products having high heat-resistant characteristic, excellent impermeable characteristic, and several other highly desirable characteristics.

Since carbon materials, in general, have high heat resistance, they have heretofore been used as high-temperature materials. For example, carbon materials not only constitute indispensable, principal members in high temperature gas cooled reactors, but are also important materials used in fields such as high-temperature chemical industries and the metal industries, and much effort is being expended toward industrialization of its applications in various fields.

Among carbon products, graphite has heretofore been widely used as a high-temperature material, but since graphite is permeable to gases, the range of its applications has been limited. Attempts have been made from the past to overcome this deficiency by impregnating graphite with pitch, tar, and other organic materials and sintering the graphite so impregnated, thereby to close the pores of the product. By these methods, however, satisfactory products cannot be obtained.

In addition, there has been a recent progress from the common method of closing preexistent pores as a secondary expedient to a new method of processing and finishing carbon directly into carbon materials of poreless structure. This new method comprises, essentially, slow sintering of a polymer in a neutral atmosphere to cause carbonization thereof. Originally, cellulose was used as the starting material, but recently furfuryl alcohol has been used as starting material to manufacture carbon materials. While the products produced by this method in all known cases have low permeability with respect to gases, there is still need for further research on the processes for problems such as the improvement of the carbonization yield resulting from sintering of resins and prevention of occurrence of cracks in the products due to volatile gases generated during the sintering.

It is a general object of the present invention to provide a new process for manufacturing carbon products wherein the above stated difficulties are overcome, and whereby carbon products having high heat-resistant characteristic and excellent impermeable characteristic can be produced.

Another object of the invention is to provide a process as stated above whereby carbon products of almost any desired shape can be produced by shaping the starting material prior to sintering into a shape similar to said desired shape.

A further object of the invention is to provide a process for producing carbon products having, in addition to high heat resistance and low permeability, various other highly advantageous properties such as hardness, high wear resistance, low specific gravity, high oxidation resistance, and high graphitization resistance.

According to the present invention, briefly stated, there is provided a process for manufacturing carbon products wherein a resin is synthesized from pyrrole and furfural and then sintered and carbonized directly in a non-oxidizing atmosphere.

More specifically, according to the invention there is provided a process for manufacturing carbon products which comprises preparing a condensation product of pyrrole and furfural, forming a synthetic polymer with the condensation product as its base material into a desired shape, and sintering the synthetic polymer so formed within a non-oxidizing atmosphere, thereby to produce a carbon product of a shape similar to said desired shape of the synthetic polymer.

Figure 2:
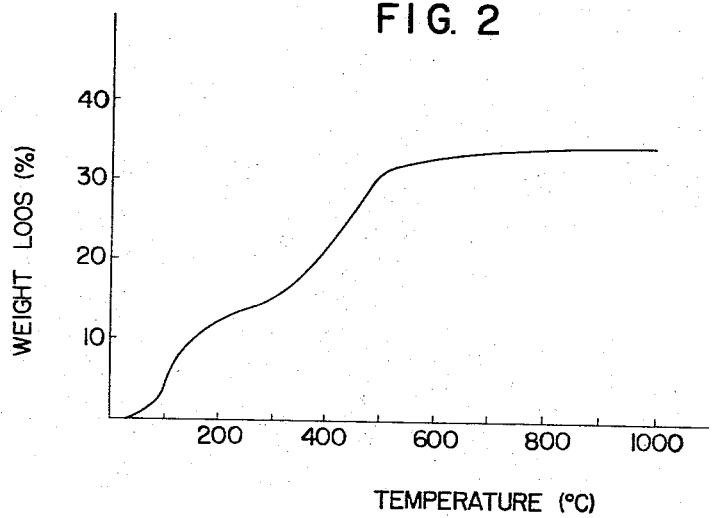

The nature, details, and effectiveness of the invention will be more clearly apparent from the following detailed description with respect to illustrative examples of the process according to the invention and from the accompanying drawings in which:

FIG. 1 is a graphical representation showing a curve indicating the relationship between carbonization yield and quantity of pyrrole added according to the invention; and FIG. 2 is a graphical representation showing a curve indicating the relationship between resin weight loss due to heat treatment and the heating temperature.

Example 1

25 weight percent pyrrole and 75 weight percent furfural were mixed thoroughly, and, as the mixture was stirred under cooling, 0.2 weight percent concentrated hydrochloric acid were added thereto by drops, whereby a resin was produced. This resin was shaped into a sheet (of 1-mm. thickness), which was sintered and carbonized in a nitrogen atmosphere as the temperature thereof was raised to 1,000 degrees C. at a temperature rise rate of 100 deg. C./hr.

The resulting carbonization yield was 66.7 percent, and the bulk specific gravity of the resulting carbon product was 1.55. The helium gas permeability of this resin was measured by an ordinary method and found to be $2.97 \times 10^{-9}$ cm.$^2$/sec.

The carbon product was further sintered by similarly heating in a nitrogen atmosphere up to 1,300 degrees C. at a temperature rise rate of 100 deg. C./hr. When the helium gas permeability of the resulting product was measured, it was found to be an extremely low value below $1 \times 10^{-12}$ cm.$^2$/sec. which was the measurable limit of the measuring apparatus.

Elementary analysis of the resin indicated a composition of 71.8 percent carbon, 3.6 percent hydrogen, 3.8 percent nitrogen, and 20.8 percent oxygen.

Example 2

Similarly, as in Example 1, 0.2 percent concentrated hydrochloric acid was added to a mixture of 25 weight percent pyrrole and 75 weight percent furfural. The resulting mixture was polymerized in a rotating cylindrical container, whereby a cylindrical resin product was formed (of 2-mm. wall thickness). This resin product was heated in exactly the same manner as set forth in Example 1 to 1,300 degrees C. to cause carbonization thereof and produce a cylindrical carbon product.

The helium gas permeability of this carbon product was measured and found to be an extremely low value below $1 \times 10^{-12}$ cm.$^2$/sec.

Referring to FIG. 1, the carbonization yield characteristic curve shown therein indicates the effect of addition percentage of pyrrole relative to furfural on the carbonization yield in the process according to the invention. As is apparent from this curve, the preferable range of addition percent of pyrrole relative to furfural is approximately from 30 to 50 percent, and the maximum carbonization yield is obtained with an addition of pyrrole of 33 percent.

FIG. 2 shows a thermal weight loss characteristic curve obtained by measuring by means of a thermobalance the weight loss due to heating of the resin used in the process of the invention. As is observable from this curve, there is a substantial weight loss in the vicinity of 400 degrees C. That is, maximum generation of gases is indicated in this temperature region. Accordingly, it is preferable to heat the resin at a slow rate of temperature rise in this temperature region.

The gases generated during the thermal decomposition of the resin are $CO$, $H_2$, $CH_4$, $CO_2$, $NH_3$, $H_2O$, and others, and it was found that the quantity of gases of high molecular weight is extremely small and that tar-like volatile substances were also almost non-existent.

As is apparent from the above described examples, the gas permeabilities of the carbon products produced according to the present invention are of extremely low values which heretofore could not be attained. Moreover, each product was homogeneous with respect to its characteristics and quality.

Furthermore, the carbonization yield resulting from carbonization of the starting material according to the invention is approximately 67 percent, which is much higher than the 25 percent yield in the case of cellulose and 59 percent in the case of furfuryl alcohol, both obtained according to conventional methods. This indicates that the quantity of decomposition gases generated at the time of sintering and carbonization according to the present invention is low, whereby the possibility of rupturing or damaging of the product during sintering can be greatly reduced.

In addition, by shaping the resin into any desired configuration, a carbon product of a shape similar to said configuration can be produced, this configuration not being limited to sheets, plates, and cylinders.

In its properties, also, the carbon product of the invention possesses several advantages. For example, this carbon product has a combination of the desirable characteristics of glass and graphite, including an extremely low gas permeability as described above. In addition, it has high hardness, low specific gravity, higher oxidation resistance than graphite, and high resistance to graphitization.

Since the carbon product afforded by the invention has excellent characteristics such as high heat resistance, high wear resistance, and high impermeability, it is applicable to a wide range of uses in various fields such as the atomic power industries, the high-temperature chemical industries, and metal industries.

What we claim is:

1. A process for manufacturing carbon products which comprises sintering within a non-oxidizing atmosphere a synthetic polymer having as its base material a condensation product of pyrrole and furfural and having a desired configuration, thereby to produce a carbon product of a configuration similar to said desired configuration of the synthetic polymer.

2. A process for manufacturing carbon products which comprises preparing a condensation product of pyrrole and furfural, forming a synthetic polymer with the condensation product as its base material into a desired shape, and sintering the synthetic polymer so formed within a non-oxidizing atmosphere, thereby to produce a carbon product of a shape similar to said desired shape of the synthetic polymer.

References Cited
FOREIGN PATENTS 921,236   3/1963   Great Britain.

ROBERT F. WHITE, *Primary Examiner.*

J. A. FINLAYSON, *Assistant Examiner.*